Figure 1:
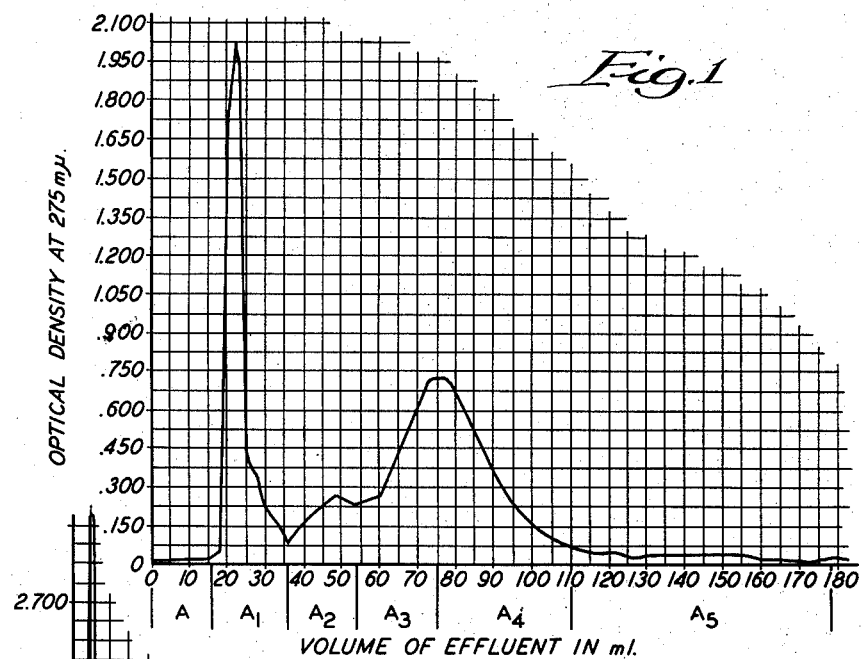

INVENTORS:
Wilfrid F. White,
Wendell A. Landmann
and William L. Pierce,
BY Carl C. Batz
ATTORNEY.

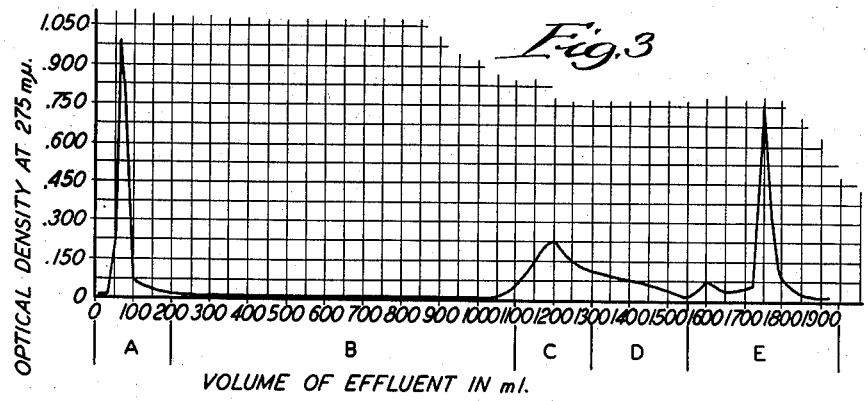
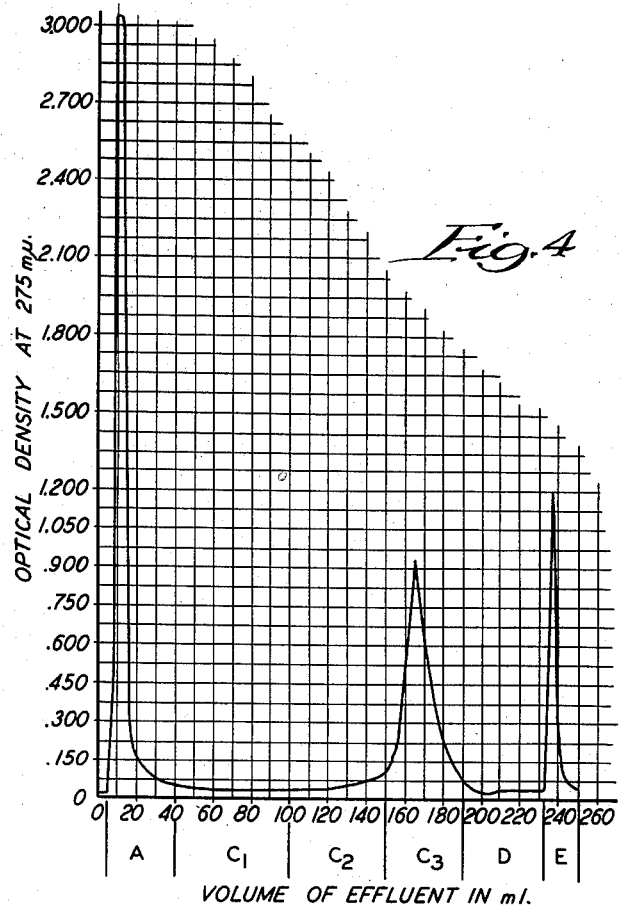

United States Patent Office 2,945,785
Patented July 19, 1960

2,945,785

METHOD OF OBTAINING ADRENOCORTICO-TROPIC HORMONE PREPARATION OF ENHANCED POTENCY

Wilfrid F. White, Lombard, Wendell A. Landmann, Clarendon Hills, and William L. Fierce, Algonquin, Ill., assignors to Armour and Company, Chicago, Ill., a corporation of Illinois Filed Sept. 15, 1952, Ser. No. 309,586

4 Claims. (Cl. 167—74)

This invention relates to a method of obtaining an adrenocorticotropic hormone preparation of enhanced potency.

Since the discovery that an adrenal gland stimulating substance can be extracted from pituitary glands, there has been a continuing and extensive search for methods of obtaining this substance in preparations of ever-increasing purity and potency. This search has been spurred by the fact that the adrenal gland stimulating substance has been found to be of outstanding value in the alleviation of numerous pathological conditions in human beings, and by the fact that this desirable effect is obtained by the injection of the substance into the human body.

The active factor in adrenal gland stimulating substances of the type described is now generally designated as the adrenocorticotropic hormone or, more succinctly, as ACTH. However, ACTH has not been isolated and its molecular structure has not been definitely characterized. It is believed to be a protein by some authorities, or more specifically a polypeptide, but even its approximate molecular weight is disputed. At first the ACTH hormone was believed to have a molecular weight of the order of 20,000 but more recently estimates in the neighborhood of 3,000 to 4,000 have been favored. It has also been suggested that ACTH activity may be evidenced (or at least associated with) by protein components of markedly different molecular weights. This is supported by the fact that ACTH preparations can be subjected to degradative acid or enzyme hydrolysis without destroying the ACTH activity. In fact, the active factor in a pepsin-hydrolyzed ACTH preparation has been tentatively designated as adrenocorticotropin-B, which is believed to be physically distinguishable, although displaying the same adrenal gland stimulating effect, as unhydrolyzed adrenocorticotropin. Therefore, it has been desired to provide a method for separating both the hydrolyzed and unhydrolyzed ACTH in order that their distinctive properties could be studied. Ultimately, it is desired to find a method for preparing pure ACTH.

The generally acepted standard of potency for ACTH preparations is the "International Standard" adopted by the World Health Organization. One "unit" under the International Standard is defined as equivalent to the potency of 1 mg. of preparation LA–1–A when tested by the method of M. Sayers, G. Sayers, and L. A. Woodbury, Endocrinology, 42, 379 (1948).

The early ACTH preparations, which had potencies approximating standard, were essentially crude extracts of pituitary glands and were not considered safe for injection into humans. It was later discovered that by subjecting such crude extracts to acid hydrolysis that their potency could be increased to at least twice standard, while at the same time destroying undesirable posterior pituitary factors. These preparations, which were suitable for injections into humans, are described in the co-pending application of Joseph D. Fisher, Serial No. 122,-588, filed October 20, 1949. Subsequently, ACTH concentrates have been produced by various techniques. For example, ACTH concentrates of 20 to 40 times standard have been prepared by the method described in the co-pending application of Lotti J. Walaszek, Serial No. 172,011, filed July 3, 1950, now Patent No. 2,739,099. In one specific procedure described in the last cited application, a crude ACTH preparation is pepsin-hydrolyzed, and the hydrolyzed material is fractionated with trichloroacetic acid. More recently, crude ACTH preparations have been further purified with cellulose and oxycellulose by batch adsorption and elution techniques (see Astwood, Raben, Payne, and Grady, J. Amer. Chem. Soc., 73, 2969 (1951)). Oxycellulose-purified ACTH concentrates have been prepared with potencies from 80 to 100 times standard. Even these concentrates, however, do not provide a final answer to the quest for satisfactory injectible ACTH preparations, and they fall far short of the theoretical maximum for pure ACTH. In other words, there is a need for a process which can be used to enhance the potency still further of oxycellulose-purified concentrates. There is also a need for a process which can be used as an alternative to the oxycellulose process to achieve at least as great degree of purification of a crude extract, while at the same time lending itself more readily to fairly large scale commercial production.

It is therefore a general object of this invention to provide a method of obtaining adrenocorticotropic hormone preparations of enhanced potency. Another more specific object is to provide a method for separating different types of ACTH-active components, such as the unhydrolyzed and hydrolyzed ACTH-active components. A further object is to provide a process which can be used to increase the potency still further of existing ACTH concentrates, particularly oxycellulose-purified concentrates. It is also an object to provide a process which can be used as an alternative to present processes of purifying crude ACTH extracts with pronounced advantages for fairly large scale purification operations. In this connection, it is a specific object to provide an alternative to the oxycellulose process which will be capable of achieving at least as great a degree of purification of a crude extract. A still further object is to provide a process for preparing extremely high potency ACTH preparations which closely approach pure adrenocorticotropin. Further objects and advantages will appear as the specification proceeds.

This invention is based in part on the discovery that carboxylic type cation exchange resins are highly selective for the active component in protein mixtures of ACTH-active and ACTH-inactive components, thereby permitting a sharp separation of the active and inactive components by adsorption and elution techniques. It has also been discovered that the carboxylic type cation exchange resins can be used effectively to carry out the separation in a chromatographic column. This appears to be due to the fact that in percolating through a bed of a finely-divided carboxylic type cation exchange resin, the ACTH-active and inactive components spread out into widely separated bands, the migration of the ACTH-active component being held up within the resin bed while the ACTH-inactive component passes out with the percolate. A further discovery, which is not understood from a theoretical standpoint, is that the carboxylic type cation exchange resins display their greatest selectivity for the preparation of this invention when they are used in their salt form and when the protein mixture to be purified is contacted with the resin in an aqueous carrier at a distinctly basic pH. Another related discovery is that it is desirable to buffer the aqueous carrier to a basic pH with a carbonate-bicarbonate buffer. It has also been discovered that separations of different types of ACTH-active components can be carried out in accordance with the method of this invention. These, as well as other discoveries and findings, are subsequently discussed in detail.

Any adrenocorticotropic hormone-containing substance dissolved or suspended in a suitable solvent can be used as a starting material in practicing the method of this invention. More specifically, ACTH preparations in a liquid carrier can be used ranging in potency from crude pituitary extracts of about standard to oxycellulose-purified concentrates of 80 to 100 times standard. Suitable ACTH preparations are also characterized in general by being protein mixtures of ACTH-active and ACTH-inactive components. Substantially unhydrolyzed ACTH preparations are preferred, and particularly unhydrolyzed oxycellulose-purified concentrates, because the unhydrolyzed preparations are currently preferred for parenteral administration. However, excellent results are obtained with hydrolyzed ACTH preparations, such as acid-hydrolyzed or proteolytic enzyme-hydrolyzed preparations. Preparations which have been subjected to both acid and enzyme hydrolysis are of particular interest because two separate types of ACTH-active components can be separated therefrom. Specifically, the unhydrolyzed oxycellulose-purified product described in the Astwood et al. reference cited above can be used. Another specific starting material is the acid-hydrolyzed ACTH concentrate described in co-pending application Serial No. 122,588. The acid-hydrolyzed and pepsin-hydrolyzed preparation described in co-pending application Serial No. 172,011 is also desirable for some purposes. Other specific starting materials can be prepared by subjecting the oxycellulose-purified product of Astwood, et al. to either pepsin or acid hydrolysis (HCl), or both.

While other liquid carriers can be used, such as ethanol, dioxane, ethylene glycol, acetone, isopropanol, etc., water is preferred. The aqueous carrier should be adjusted to a pH at which the ACTH-active component (or components, in some cases) is selectively adsorbed on the carboxylic type cation exchange resin. In general, pH's ranging from pH 3.5 to pH 9 are operable. When the resin is in its salt form, as will subsequently be described, the aqueous carrier should be at a basic pH, and a buffer is preferably incorporated in the carrier to maintain its pH at an alkaline pH at which the ACTH-active component is selectively adsorbed. A carbonate-bicarbonate buffer is particularly suitable. For example, excellent results have been obtained with a .1 M sodium carbonate-bicarbonate buffer (pH 8.5). Instead of sodium, other alkali metal carbonate-bicarbonate buffers can be used, especially potassium. For best results, the alkali metal carbonate-bicarbonate buffer should be at a pH from about 8.0 to 9.0, and should contain a sufficient concentration of alkali metal carbonate and bicarbonate to exhibit an effective buffering action without having excessive quantities of the salts in the solution.

The preferred adsorbent material for use in practicing this invention can be designated generically as carboxylic type cation exchange resins. These resins can be made by the copolymerization of a polymerizable acid and a polymerizable divinyl compound having non-conjugated double bonds, as described in United States patents Serial Nos. 2,340,110 and 2,340,111. The carboxylic type cation exchange resin is preferably employed in a finely-divided condition. As a specific example of the type of resins falling within the scope of this invention can be mentioned Amberlite IRC–50, manufactured by the Rohm & Haas Company of Philadelphia, Pennsylvania, which has a wet screen grading of about 16 to 50 mesh, when the resin is in its hydrogen or acid form. Amberlite XE–97 is a modification of Amberlite IRC–50, also manufactured by the Rohm & Haas Company, which has been found especially suitable for practicing this invention. The principal difference between IRC–50 and XE–97 is that XE–97 has a substantially smaller average particle size.

Carboxylic type cation exchange resins can be used as adsorbents in either their acid or salt form for the purposes of this invention, but their salt form has been found to have an unexpectedly superior selectivity in treating protein mixtures of ACTH-active and inactive components. These resins, such as IRC-50 and XE–97, possess only one type of active exchange center—a carboxylic acid group, which is readily convertible to a salt. These resins are usually supplied in their hydrogen or "free-acid" form, but can readily be converted to their salt form by leaching with an alkali or basic salt, for example, with sodium hydroxide. The resins swell considerably on transformation from the acid to the salt form, but this swelling is reversible. The resins can be used in their salt form at alkaline pH's, while at pH's below 7.0 the resins rapidly revert to their acid form.

Various adsorption and elution techniques can be used in practicing this invention but it is preferred to carry out the fractionation in a column packed with the salt form of a carboxylic type cation exchange resin. Because of the swelling of the resins in changing from their acid to their salt form, it is preferable to slurry the resin in a basic aqueous solution, thereby converting it to the salt form before introducing it into the column. For example, the resins can be leached with sodium or potassium hydroxide before being packed into the column. However, it is preferred to pre-treat the resin with the particular buffer solution to be used as the liquid carrier for the protein mixture to be purified. Specifically, it is preferred to slurry the resin in a carbonate-bicarbonate buffer, such as the buffers described previously. The salt form of the resin is then separated from the bulk of the treating solution and packed in the column in wet condition so that the resin does not dry out. If necessary, additional buffer solution is added to the column to fill it with liquid before the protein mixture is introduced.

No special technique is required for passing or percolating the protein mixture in its aqueous carrier through the resin bed in the column. Either gravity or pressure flow can be used. Usually the solution of the protein mixture is introduced into the top of the column, and a corresponding amount of effluent or percolate is removed from the bottom of the column, until all of the material has been introduced into the column.

Most ACTH preparations are quite soluble in water and dilute salt solutions. Therefore, in preparing the starting material, it is only necessary to mix the protein mixture with the aqueous carrier until the mixture dissolves. If a portion of the material remains undissolved, it is preferred to clarify the solution by filtration or other procedure before passing it through the column. By way of specific example, excellent results have been achieved by applying an ACTH preparation to the column in an amount of 10 mg. per ml. of liquid carrier. The temperature of the solution, as well as the temperature within the column, is not known to be especially critical. Operations are usually conducted at room temperature (20 to 25° C.).

When operating in the manner indicated, after the solution of the ACTH preparation has been applied to the column, it is preferred to apply added quantities of the same aqueous buffer to the top of the column so that it percolates through the resin bed. This washing of the resin is continued until the quantity of ACTH-inactive protein material in the percolate falls to a minimum. During the first part of the washing operation, the quantity of protein material in the percolate rises rapidly and then later falls to a minimum value. It has been determined that under the recommended conditions as set out above, this wash fraction does not contain any appreciable quantity of the ACTH-active component, which is effectively held up within the column. Therefore, the progress of the fractionation can be followed by testing the optical density of the percolate at a particular wave length as a measure of protein concentration, or by other simple analytical test, such as the ninhydrin test. In actual commercial operation, it would be practical to standardize conditions and control the fractionation merely by noting percolation times and percolate volumes.

After the removal of the ACTH-inactive component in the manner described, the ACTH-active component can be eluted from the resin bed by any suitable means. However, the preferred procedure varies with the type of ACTH preparation being fractionated. For example, with an unhydrolyzed ACTH preparation, such as the oxycellulose-purified product of Astwood, et al., the ACTH-active component can be eluted effectively by merely continuing to percolate the same buffer solution through the column. A short time after the protein concentration of the percolate falls to a minimum as described above, the continued passage of the buffer solution through the resin bed will cause the protein concentration of the percolate to begin to increase, and after passing through a maximum it will again decrease to a negligible amount. It has been determined that this fraction contains the ACTH-active component. However, if desired, the pH of the wash can be shifted to effect a more rapid release of the ACTH-active component. In fact, this procedure is preferred when working with hydrolyzed ACTH preparations. For example, when working with the acid and pepsin-hydrolyzed material described in co-pending application Serial No. 172,011, the ACTH-active component can be readily eluted by adjusting the pH of the buffer to a pH of from 9.1 to 9.75. This can be easily accomplished by adding an alkali hydroxide to the carbonate-bicarbonate buffer to adjust the pH upwardly. Higher pH's can also be employed, but the advantage of using the lower pH is that separate fractions of ACTH-active components can be collected when the starting material has been subjected to both enzyme and acid hydrolysis. Apparently, the first fraction collected within the pH range of from 9.1 to 9.75 is the pepsin-hydrolyzed ACTH-active component, while the acid-hydrolyzed ACTH-active component can be collected by raising the pH of the buffer solution above 10.0. By way of specific example, excellent results have been obtained in the fractionation of a pepsin-hydrolyzed and hydrochloric acid-hydrolyzed ACTH preparation by putting the preparation on the column in a buffer at pH 8.5, washing the column with a buffer at the same pH to remove the ACTH-inactive component, washing the column with a buffer at pH 9.25 to collect a first ACTH-active component, and finally washing the column with a buffer at pH 11.25 to collect a second ACTH-active component.

After the eluting steps, the percolate fractions containing the ACTH-active components can be treated to recover the adrenal gland stimulating substance as a dry product. This may be achieved by any suitable method, preferably by lyophilization.

A more comprehensive understanding of various embodiments of this invention can be obtained by reference to the following examples and the figures set out in the accompanying drawing which are illustrative of the procedures of the examples.

*Example I*

Amberlite XE-97 resin as supplied by the manufacturer was suspended in water and after standing for a few minutes a very fine material was poured off and discarded. The resin was then cycled batch-wise twice through 2 N sodium hydroxide and 2 N hydrochloric acid, alternately. The resin was then stored in the acid form for use.

Purified XE-97 resin was equilibrated to pH 8.5 by stirring in successive batches of .1 M carbonate-bicarbonate buffer at pH 8.5. The resin was then stirred in a large volume of .10 M pH 8.5 carbonate-bicarbonate buffer. The excess buffer was poured off and the resin was slurried into a glass column 5.4 cm. in diameter until a height of 70 cm. was reached. The resin was allowed to settle by gravity alone until the level became stable. The excess buffer was then siphoned off the top of the column until the resin and buffer levels were equal.

620 mgm. of unhydrolyzed oxycellulose-purified ACTH (Astwood et al., supra) was extracted with 35 cc., then 35 cc., and finally with 20 cc. of .10 M pH 8.5 carbonate-bicarbonate buffer. (The ACTH starting material was a mixture of 289 mgm. having a potency of 40.2 times standard and 331 mgm. having a potency of 30 times standard.)

The extracts were combined and the solution was applied to the column. When the added solution had completely entered the column, 35 cc. of fresh buffer were added to complete the washing of the sample into the column. When the wash had entered the column additional pH 8.5 .10 M buffer was added to the column until a height of approximately 30 cm. of buffer had been added. The buffer at the top of the column was then replaced as used until the end of the chromatogram.

Fig. 1 is a graph of the ultra violet absorption and the column effluent during the course of the experiment. Previous experiments had shown that the slowest moving component (the area marked A3 and A4 in the figure) contained all the ACTH activity. This fraction is therefore used to produce a clinically useful product by neutralization of the solution to pH of between 5 and 3.

The ultra violet absorption was measured on a Beckman Model DU spectrophotometer at the wave length indicated on the graph. The combined $A_1$ and $A_2$ fractions weighed 47.6 mg., contained 40.6% of the optical density, and 10.0% of the ACTH activity as determined by the standard U.S.P. assay. The combined $A_3$ and $A_4$ fractions weighed 157 mg., contained 50.1% of the optical density, and 59.1% of the ACTH activity as determined by the standard U.S.P. assay.

*Example II*

Figure 2:
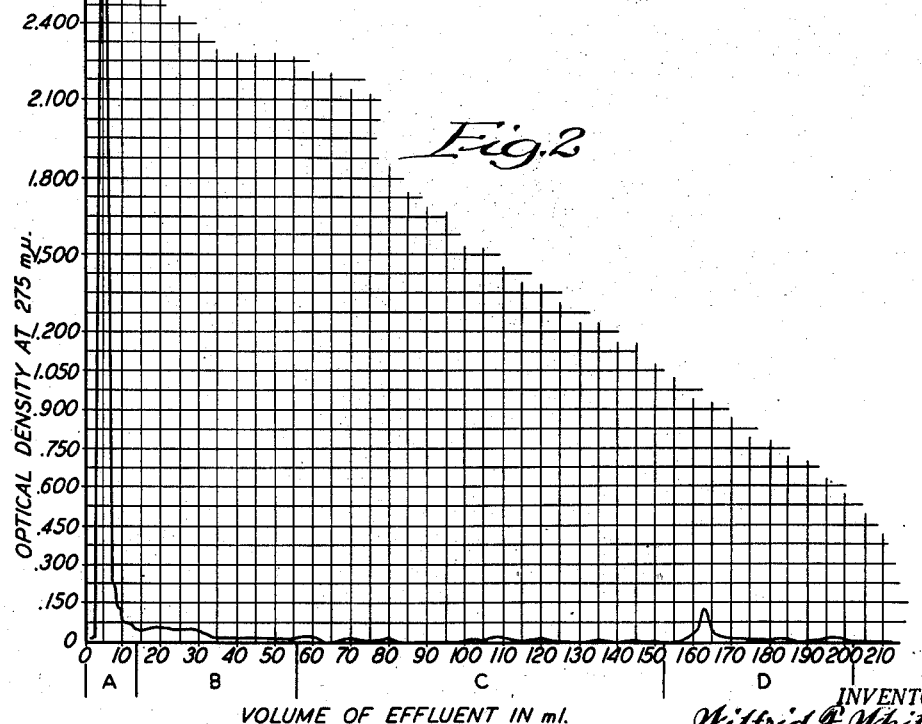

The preparation of the resin was the same as in Example I. Here, however, a 15 cm. high column was used in a tube 0.9 cm. in diameter. The preparation of the sample and its application to the column were also the same as in Example I except that the amount of sample and the volume of solution were scaled down in ratio to the cross-sectional areas of the columns. Fig. 2 shows the chromatogram obtained with a crude ACTH preparation. Here again the greater part of the activity is found in the portion of the eluate following the initial large peak.

The crude ACTH preparation used in this example consisted of 20.7 mg. of an acid hydrolyzed ACTH preparation having a potency of about 3-4 times standard (the starting material was prepared by the method described in co-pending application Serial No. 122,588, supra). The A and B fractions were eluted with pH 8.5 M/10 sodium carbonate-bicarbonate buffer, the C fraction with pH 9.25 M/10 sodium carbonate-bicarbonate buffer, and the D fraction with pH 11.25 M/10 sodium carbonate-bicarbonate buffer. The A fraction contained 75.4% of the optical density and 4.2% of the ACTH activity; the B fraction, 13.59% of the optical density and 51.0% of the ACTH activity; the C fraction, 17.15% of the optical density and 4.3% of the ACTH activity; and the D fraction contained 17.25% of the optical density and 5.2% of the ACTH activity.

*Example III*

Here again the preparation of the resin and columns were the same as before. In this case a column 15 cm. high and 3.4 cm. in diameter was used. The starting material was a purified acid and pepsin treated fraction of which 100 mgm. were used. (The starting material had a potency of about 24 times standard and was prepared by the method described in co-pending application Serial No. 172,011, supra.) In this case and with all other pepsin treated materials, no activity was found in the eluate at pH 8.5. However, successive additions of pH 9.25 and pH 11.25 carbonate-bicarbonate buffers eluted fractions containing considerable activity. Fig. 3 shows the results of this column.

Fraction C contained 24% of the optical density and 38.2% of the ACTH activity; fraction D contained 15.02% of the optical density and 18.1% of the ACTH activity; and fraction E contained 31.5% of the optical density and 19.6% of the ACTH activity.

*Example IV*

Fig. 4 shows a chromatogram run on a material prepared by a preliminary 24 hour pepsin treatment of the oxycellulose-purified material of Example I. The procedure used was a duplicate of that in Example III. In this case, however, the ACTH activity was found only in the fraction eluting at pH 9.25.

The starting material consisted of 746 mg. having a potency of about 17 times standard. The preliminary pepsin treatment was carried out with 0.37% crystalline pepsin at pH 2.5. The $C_3$ fraction contained 25.2% of the optical density and 84% of the ACTH activity; and the E fraction contained 8.28% of the optical density and 2.5% of the ACTH activity.

While in the foregoing specification specific embodiments of this invention have been set out in considerable detail for purpose of illustration, it will be apparent to those skilled in the art that many of the details set forth can be varied widely without departing from the spirit of the invention.

We claim:

1. The chromatographic separation method for obtaining an adrenocorticotropic hormone preparation of enhanced potency from a mixture of ACTH-active and ACTH-inactive components obtained from pituitary glands, characterized by the steps of percolating said mixture in an aqueous solution at an alkaline pH up to 9.0 through a finely-divided bed of the salt form of a carboxylic-type cation exchange resin, said resin being characterized by having carboxylic acid groups in the salt form as the only active exchange centers, thereby adsorbing the ACTH-active component on said resin in preference to said ACTH-inactive component, removing a substantial portion of the unadsorbed ACTH-inactive component from said resin with the percolate while leaving the ACTH-active component on said resin, and then eluting the ACTH-active component from said resin by percolating an aqueous solution at an alkaline pH above 8.0 through said resin, thereby obtaining in the percolate from said last-mentioned percolation an ACTH preparation of enhanced potency.

2. The chromatographic separation method for obtaining an adrenocorticotropic hormone preparation of enhanced potency from a mixture of ACTH-active and ACTH-inactive components obtained from pituitary glands, characterized by the steps of percolating said mixture in a basic aqueous solution at a pH of 8.0 to 9.0 through a finely-divided bed of the salt form of a carboxylic-type cation exchange resin, said resin being characterized by having carboxylic acid groups in the salt form as the only active exchange centers, thereby adsorbing the ACTH-active component on said resin in preference to said ACTH-inactive component, removing a substantial portion of the unadsorbed ACTH-inactive component from said resin with the percolate while leaving the ACTH-active component on said resin, and then eluting the ACTH-active component from said resin by percolating an aqueous solution at a pH of from 8.0 to about 11.25 through said resin, thereby obtaining in the percolate from said last-mentioned percolation an ACTH preparation of enhanced potency.

3. The chromatographic separation method for obtaining an adrenocorticotropic hormone preparation of enhanced potency from a mixture of ACTH-active and ACTH-inactive components, said mixture having been prepared from pituitary glands by extracting the glands and thereafter subjecting the extracted material to both an acid and an enzyme hydrolysis, characterized by the steps of percolating said mixture in a basic aqueous solution through a finely-divided bed of the salt form of a carboxylic type cation exchange resin, said aqueous solution being buffered to a basic pH up to pH 9.0 at which the ACTH-active component migrates more slowly through said resin bed than the ACTH-inactive component, said resin being characterized by having carboxylic acid groups in the salt form as the only active exchange centers, percolating additional quantities of said basic aqueous solution through said resin bed to remove the ACTH-inactive component in the percolate, then eluting said resin bed to obtain a first ACTH-active component by washing said bed with an aqueous eluant adjusted to a pH between 9.1 and 9.75, and thereafter further eluting said resin bed to obtain a second ACTH-active component by washing said bed with an aqueous eluant adjusted to a pH above 10.0.

4. Method of obtaining an adrenocorticotropic hormone preparation of enhanced potency from an unhydrolyzed oxycellulose-purified mixture of ACTH-active and ACTH-inactive components, characterized by the step of contacting an aqueous solution of said mixture with the salt form of a carboxylic type cation exchange resin, said resin being characterized by having carboxylic acid groups in the salt form as the only active exchange centers, said aqueous solution being buffered to a basic pH up to 9.0 at which the ACTH-active component is selectively adsorbed on said resin.

References Cited in the file of this patent

UNITED STATES PATENTS 2,375,979   Doisy _____ May 15, 1945

OTHER REFERENCES

Dixon et al.: Nature, vol. 168, No. 4285, pp. 1044, 1045, Dec. 15, 1951.

Ralli: Adrenal Cortex, 1951, p. 30.

Science News Letter, vol. 62, No. 23, p. 360.

Li et al.: Arch. Biochem. and Biophysics, vol. 36, pp. 462–467, April 1952.

Amberlite IRC-50, 9 pp., pub. February 1948.

Astwood et al.: in J.A.C.S., June 1951, pp. 2969, 2970.

"Recent Progress in Hormone Research," The Proc. of the Laurentian Hormone Conf., Mont Tremblant, Quebec, September 1951, pp. 1–73 (pp. 26–43, 64, 71–73 esp. pert.), copyright 1952.

"Ion Exchange," March 1950, p. 17, pub. by Rohm and Haas Co., The Resinous Prod. Div., Phila. 5, Pa.

Winters: Art. reprinted from Drug and Allied Ind., July 1950, "A New Unit Operation for the Drug Manufacture."

Payne et al.: J. Biol. Chem., December 1950, vol. 187. No. 2, pp. 719–730.